Patented Sept. 30, 1947

2,428,279

UNITED STATES PATENT OFFICE 2,428,279

ALKYLATION OF AROMATICS

Vladimir N. Ipatieff, Chicago, and Carl B. Linn, Riverside, Ill., assignors to Universal Oil Products Company, Chicago, Ill., a corporation of Delaware No Drawing. Application December 1, 1944, Serial No. 566,236

10 Claims. (Cl. 260—671)

The present invention relates to the interaction of alkylatable aromatic hydrocarbons with olefinic hydrocarbons in the presence of a novel alkylation catalyst. It is more particularly concerned with the production of alkylated aromatic hydrocarbons which can be used in various organic syntheses as starting materials for the production of highly desirable resins and similar compounds.

The alkylation of aromatics, particularly benzene with ethylene, has become very important at the present time. The primary product of the reaction, ethyl benzene, upon dehydrogenation yields substantial quantities of styrene which is now extensively employed in the manufacture of synthetic rubber. Ethyl benzene, isopropyl benzene and similar compounds have been found to have excellent antiknock properties and are valuable as addition agents to gasolines to produce premium motor fuels.

Sulfuric acid is well known in the prior art as a satisfactory catalyst for the interaction of benzene with olefins, such as propylene, butylene, amylene and higher boiling material. However, this catalyst has been found ineffective for the alkylation of benzene with ethylene since most of the ethylene reacts with the sulfuric acid to form ethyl sulfuric acid or diethyl sulfate.

Ordinarily, when effecting the latter reaction, that is the interaction of benzene and ethylene, solid catalysts such as aluminum chloride activated with hydrogen chloride, silica-alumina, etc., have been employed. These catalysts possess disadvantages which are inherent in their physical structure. It is preferable, if possible to employ a liquid catalyst so that intimate mixing of the catalyst and reactants may be obtained.

We have discovered that by use of a combination of two compounds which individually will not catalyze the interaction of benzene and ethylene, a very satisfactory catalyst for this reaction is formed. Further, the catalyst is in substantially liquid phase and possesses all the advantages inherent in a liquid catalyst. This new catalyst comprises a mixture of boron trifluoride and fluorosulfonic acid.

In one embodiment the present invention comprises a process for the alkylation of aromatics with olefins, particularly ethylene in the presence of boron trifluoride and fluorosulfonic acid.

Benzene may be readily obtained from distillation of coal tar products or may be found in large quantities in straight-run gasolines from various crude oils, particularly the coastal crude oils. Benzene may also be produced by the catalytic dehydrocyclization of normal hexane or the catalytic dehydrogenation of cyclohexane. Although the boron trifluoride-fluorosulfonic acid catalyst is particularly applicable when ethylene is employed as the alkylating agent, our invention is broader in scope and the catalyst may be used generally for reacting aromatic hydrocarbons with either normally gaseous or normally liquid hydrocarbons, particularly mono-olefins containing from 2 to about 20 carbon atoms per molecule. In some instances diolefinic hydrocarbons can be used. Further, polymers of lower boiling olefins may also be employed as the alkylating agent although not necessarily under the same operating conditions used when employing the original mono-olefins.

The alkylation of the aromatic hydrocarbons with olefinic hydrocarbons in the presence of boron trifluoride-fluorosulfonic acid catayst may be carried out at a temperature between 0° C. to about 100° C., although a more preferable operating range is from about 10° C. to about 50° C. In any event, the temperature of the reaction should be higher than the freezing point of the catalyst. It is highly desirable that the reaction be carried out under sufficient pressure to maintain a substantial portion of the reactants in liquid phase, for example, from about 10 to about 100 atmospheres, depending upon the amount of boron trifluoride present. the temperature of the reaction and upon other factors. As is well known in the art of alkylating aromatics with olefins, the hydrocarbon feed to the alkylation reaction zone should preferably contain a substantial excess of the aromatic hydrocarbons over the olefinic hydrocarbons, for example, a molal ratio of aromatics to olefins of from about 2:1 to about 20:1 or higher. If desired, the olefinic reactants may be introduced at spaced points throughout the alkylation zone in order to maintain the desired high aromatic to olefin ratio. It is also preferable that the water content of the catalyst be kept to a minimum, usually below 5% by weight. Thus, in some instances it may be desirable to subject the hydrocarbon charging stock to a drying step prior to the introduction into the alkyation zone.

In the foregoing it has been stated that the reaction concerned is that of the interaction of an aromatic with an olefin. However, the general broad scope of this invention includes the use of compounds which form olefinic hydrocarbons under the reaction conditions and do not have any deleterious effect on the catalyst activity. In this class may be included such compounds as alkyl fluorides. The term "alkylating agent" as used hereinafter in this specification and appended claims is intended to include olefins and other compounds which react similarly to the olefins under conditions of operation without seriously damaging the activity of the catalyst.

Fluorosulfonic acid is a liquid at ordinary atmospheric temperatures and pressure. It has a faint pungent odor, it feels greasy to the touch and in contrast to the intense blistering action of hydrogen fluoride it has but little action on the dry skin. The acid boils at 163° C. with slight decomposition. It may be prepared readily by reacting fuming sulfuric acid with fluorspar or by interacting fuming sulfuric acid with anhydrous hydrogen fluoride. Boron trifluoride has a boiling point of —101° C. and at ordinary temperatures is a colorless gas.

The composite alkylation catalyst of this invention may be utilized in a variety of ways although the most convenient method is to dissolve substantial amounts of the boron trifluoride in fluorosulfonic acid. The alkylation process may be conducted in batch or continuous operation but from a commercial point of view the latter is preferable. The hydrocarbon reactants and catalyst are subjected to intimate contact preferably by means of a mechanically agitated alkylation zone which is maintained under sufficient pressure to keep a substantial portion of the reactants and catalyst in the liquid phase. Other types of contacting equipment may also be employed, for example, a so-called "time tank" wherein intimate contact is obtained by means of a system of baffles or orifices. Cooling means such as internal heat exchange zones must also be incorporated in the reaction zone in order to control the temperature of the exothermic alkylation reaction.

The hydrocarbon-catalyst mixture is withdrawn from the reaction zone and introduced into a gravity settling zone or other suitable separation zone. An upper hydrocarbon reaction products layer is withdrawn to a fractionation system while the lower used catalyst layer is preferably recycled to the alkylation zone although a portion thereof may be withdrawn and replaced with fresh catalyst. In certain cases, the withdrawn, used, catalyst may be regenerated and returned to the system. The hydrocarbon reaction products are fractionated to separate desired alkylation products from unconverted isoparaffins. The latter are recycled to the alkylation zone in order to maintain the desired high aromatic to olefin ratio in the hydrocarbon feed stock. Light hydrocarbon contaminants in the charging stock to the process may also be removed in the fractionation step in order to prevent their accumulation in the alkylation system. For example, if appreciable amounts of ethane, propane or butanes are introduced by employing a gaseous hydrocarbon fraction as a source of the olefin, it will be desirable to remove these constituents during the fractionation operation.

It may be desirable to agitate the aromatics with fluorosulfonic acid in the liquid phase and then introduce boron trifluoride and olefin reactants at spaced points throughout the reaction zone. Other modifications and methods of effecting contact between the aromatic and olefin reactant and the two components of the catalyst will be readily apparent to those skilled in the hydrocarbon conversion art. It is not intended to limit the general broad scope of the present invention to any particular method of contacting the catalyst and the reactants.

The following experimental data are introduced to illustrate the nature of the present invention as it is applied to the alkylation of benzene with ethylene.

About 240 grams of benzene and 93 grams of fluorosulfonic acid are present in a nickel-lined stirring autoclave and the autoclave is then sealed. About 50 grams of boron trifluoride is added under pressure and the stirring begun. Throughout the course of the reaction ethylene is added to the bomb under a pressure of 800 pounds per square inch until the quantity added is about 30 grams. During the addition the bomb is maintained at room temperature and at the end of the test the pressure, if any, on the autoclave is released through a "train" containing an alkali scrubber, a calcium chloride drying tower and a condensible gas receiver cooled to —80° C. The reaction product in the autoclave is separated from the catalyst, washed, dried, and distilled. After removing unreacted benzene, the residual material distills on plateaus corresponding to ethyl benzene, di-ethylbenzenes, tri-ethylbenzenes and higher ethylated benzenes. A substantial amount of the product has a boiling point corresponding to ethylbenzene.

We claim as our invention:

1. A process for the synthesis of hydrocarbons which comprises reacting an aromatic hydrocarbon with an alkylating agent under alkylating conditions in the presence of boron trifluoride and fluorosulfonic acid.

2. A process for the synthesis of hydrocarbons which comprises reacting an aromatic hydrocarbon with an olefinic hydrocarbon under alkylating conditions in the presence of boron trifluoride and fluorosulfonic acid.

3. A process for the alkylation of aromatic hydrocarbons with olefinic hydrocarbons which comprises contacting aromatics and olefins at a temperature from about 0° C. to about 100° C. in the presence of boron trifluoride and fluorosulfonic acid.

4. A process for the synthesis of hydrocarbons which comprises alkylating an aromatic hydrocarbon with an olefin in the presence of boron trifluoride and fluorosulfonic acid at a temperature of from about 10° C. to about 50° C. under sufficient pressure to maintain the reactants in substantially liquid phase.

5. A process for the synthesis of hydrocarbons which comprises alkylating benzene with ethylene in the presence of boron trifluoride and fluorosulfonic acid.

6. A process for the synthesis of hydrocarbons which comprises alkylating benzene with propylene in the presence of boron trifluoride and fluorosulfonic acid.

7. A process for the synthesis of hydrocarbons which comprises alkylating benzene with butylene in the presence of boron trifluoride and fluorosulfonic acid.

8. A process for the synthesis of hydrocarbons which comprises reacting an aromatic hydrocarbon with an alkylating agent in a reaction zone maintained under alkylating conditions and in the presence of boron trifluoride and fluorosulfonic acid, separating hydrocarbon reaction products from the used alkylating catalyst and recycling at least a portion of said used catalyst to the reaction zone.

9. An alkylation process which comprises agitating an aromatic hydrocarbon with fluorosulfonic acid in the liquid phase in a reaction zone, introducing boron trifluoride and an alkylating agent at a plurality of spaced points in said reaction zone, and therein reacting said aromatic hydrocarbon with said alkylating agent under alkylating conditions.

10. The process of claim 9 wherein said alkylating agent comprises ethylene.

VLADIMIR N. IPATIEFF.
CARL B. LINN.

REFERENCES CITED

The following references are of record in the file of this patent:

UNITED STATES PATENTS

| Number | Name | Date |
|---|---|---|
| 2,363,222 | Beyerstedt | Nov. 21, 1944 |
| 2,344,469 | McAllister et al. | Mar. 14, 1944 |
| 2,317,694 | Ott | Apr. 27, 1943 |
| 2,313,103 | Thomas | Mar. 9, 1943 |

FOREIGN PATENTS

| Number | Country | Date |
|---|---|---|
| 534,492 | Great Britain | Mar. 7, 1941 |
| 537,589 | Great Britain | June 27, 1941 |